United States Patent

[11] 3,590,436

| [72] | Inventors | Karl Gustav Bertil Akesson<br>Halsingborg;<br>Nils Gunnar Noresson, Hittarp, both of, Sweden |
|---|---|---|
| [21] | Appl. No. | 697,912 |
| [22] | Filed | Jan. 15, 1968 |
| [45] | Patented | July 6, 1971 |
| [73] | Assignee | Broderna Akessons Maskinfabrik AB<br>Halsingborg, Sweden |
| [32] | Priority | Jan. 19, 1967 |
| [33] | | Sweden |
| [31] | | 788/67 |

[54] ARRANGEMENT IN AN APPARATUS HAVING A STATIONARY AND A MOVABLE PRESS PLATEN, PARTICULARLY AN INJECTION MOLDING MACHINE
2 Claims, 3 Drawing Figs.

[52] U.S. Cl. ...................................................... 18/30
[51] Int. Cl. ...................................................... B29f 1/00, B30b 1/34

[50] Field of Search ............ ............................. 18/30 LA, 30 LM, 30 LV

[56]  References Cited
UNITED STATES PATENTS

| 2,689,978 | 9/1954 | Roger ........................... | 18/30 |
| 2,711,561 | 6/1955 | Studli ........................... | 18/30 |
| 2,916,768 | 12/1959 | Quere et al. .................. | 18/30 |
| 3,270,372 | 9/1966 | Hesse ........................... | 18/30 |
| 3,433,290 | 3/1969 | Eggenberger et al. ......... | 18/30 |
| 3,465,387 | 9/1969 | Allard et al. .................. | 18/30 |

Primary Examiner—J. Howard Flint, Jr.
Attorney—Karl W. Flocks

ABSTRACT: In an apparatus having a stationary and a movable press platen, a movably arranged backing member is penetrated by an element which is movable together with the movable platen and which can be clamped to the backing member for exerting pressure on the movable platen via the backing member.

ARRANGEMENT IN AN APPARATUS HAVING A STATIONARY AND A MOVABLE PRESS PLATEN, PARTICULARLY AN INJECTION MOLDING MACHINE

This invention relates to an arrangement in an apparatus having a stationary and a movable press platen and hydraulic cylinders for moving the movable press platen towards and away from the stationary press platen and for exerting pressure between the platens.

The invention has for its object in such apparatus, particularly large-capacity injection molding machines for elevated injection pressures, to provide a structurally simple and readily operable arrangement for transmitting the pressure from a hydraulic cylinder for exerting pressure between the press platens to the movable press platen after said last-mentioned platen has been moved into engagement with the stationary platen.

For achieving this object there has been provided in accordance with the invention an apparatus comprising a stationary press platen, a movable press platen, hydraulic means for moving the movable press platen towards and away from the stationary press platen, a movable backing member, an element movable together with the movable press platen, said backing member forming an opening which is penetrated by said element, means on said backing member and said element for clamping said backing member and said element to one another, and hydraulic means for exerting pressure on the backing member, pressure being exerted between the press platens via the backing member and said element connected to the movable press platen when said element and said backing member are clamped to one another.

The arrangement according to the present invention permits constructing the apparatus, whether it is an injection molding machine or a press of some kind or other, so that it is very easily accessible and readily operable and has a relatively short length. In an injection molding machine or press the arrangement also offers good possibilities of removing the molded or pressed article produced since the movable press platen can be made relatively open at the rear face thereof.

For better elucidation, an embodiment of the invention will be described more in detail in the following with reference to the accompanying drawings in which.

Figure 1:
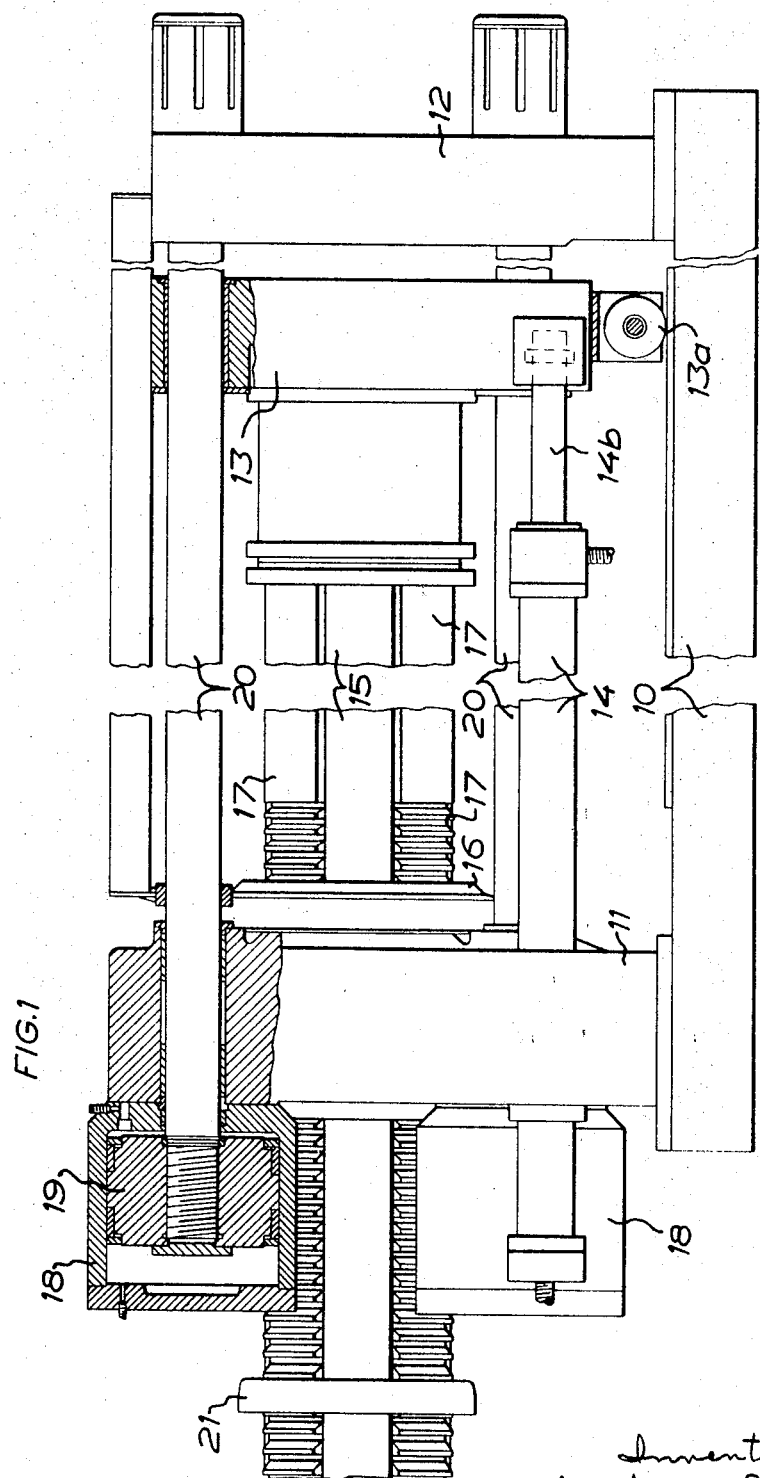
FIG. 1 shows a side elevational view, partly in axial section, of an injection molding machine according to the invention.
Figure 2:
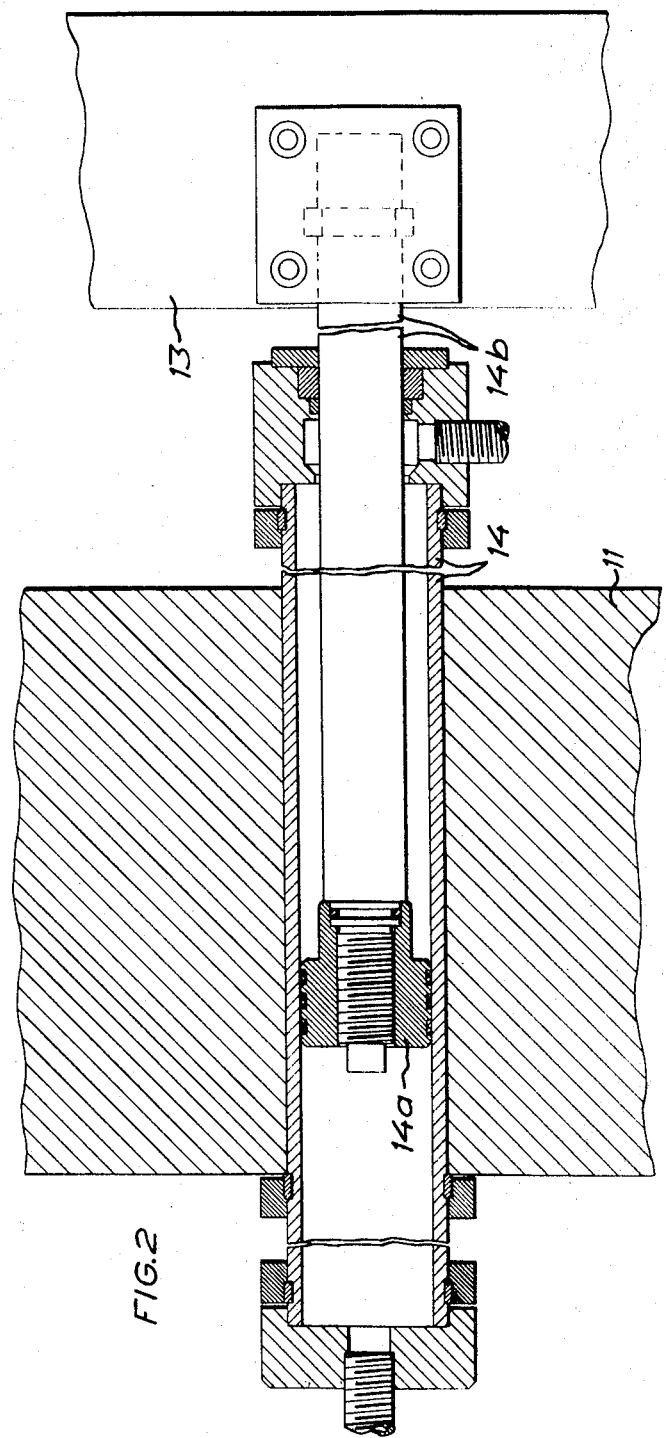
FIG. 2 shows an axial sectional view of the shifting cylinder of the machine as well as portions of means connected thereto.

The injection molding machine illustrated in the drawings comprises a frame 10 with a backing member 11 movable thereon, a stationary tool platen 12 and a movable tool platen 13 which can be driven on wheels 13a by means of a number of hydraulic shifting cylinders 14 (FIGS. 1 and 2) each of which is secured in the backing member 11 and has a piston 14a which is connected to the movable tool platen 13 by means of a piston rod 14b. Also connected to the movable tool platen 13 is a bayonet rod 15 which passes through the backing member 11. It consists of a strong tube. Rotatably mounted on the backing member 11 is an internally circumferentially grooved or serrated bayonet ring 16 which has a collar rotatably mounted in the backing member 11 and can be rotated through a limited angle, for example by means of a hydraulic operating cylinder (not shown) arranged as a link between the backing member and the periphery of the bayonet ring. The bayonet rod 15 has four axially extending circumferentially grooved or serrated portions 17 and the bayonet ring 16 in its grooved inner side has four notches 16a which permit the grooved portions 17 of the bayonet rod to move freely through the bayonet ring in a certain angular position of said ring. In an other angular position the grooved portions of the bayonet ring 16 and the bayonet rod 15 interengage. Mounted on the backing member are four hydraulic pressure cylinders 18, and pistons 19 movable in said cylinders are connected to the stationary tool platen 12 by means of four rods 20 which constitute a guide for the movable tool platen 13.

Figure 3:
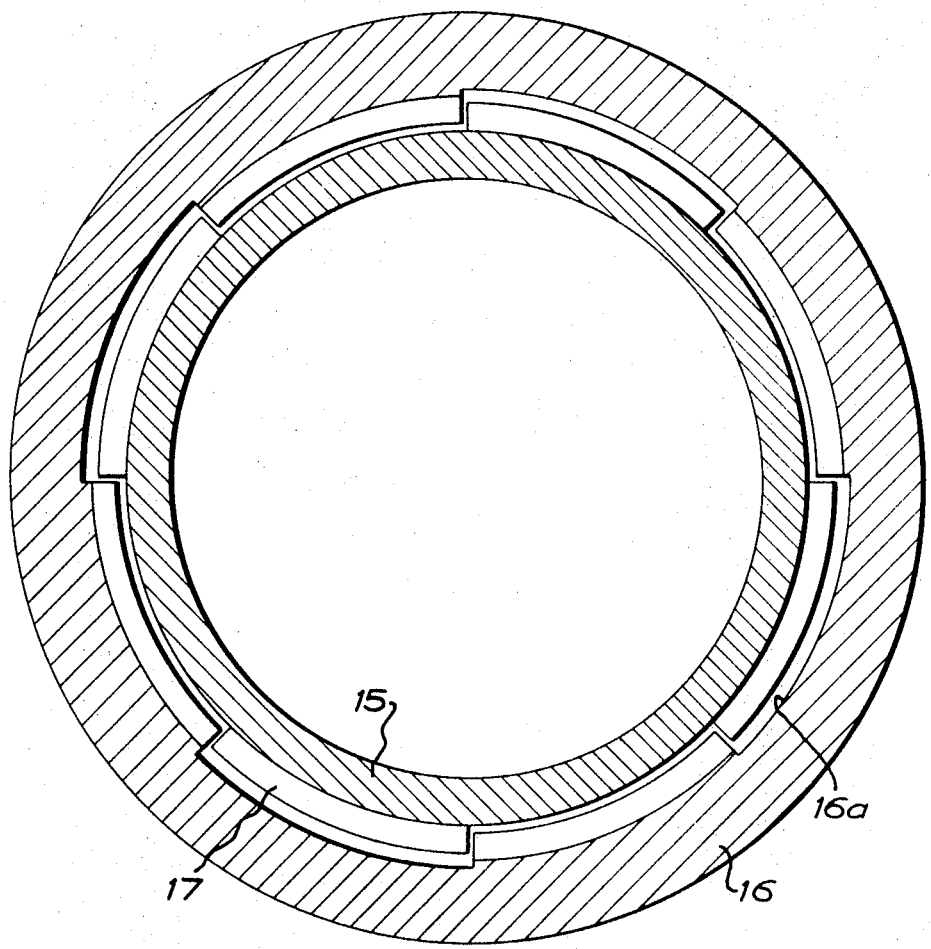
FIG. 3 shows an end view of a bayonet ring of the machine, with a bayonet rod inserted in said ring shown in cross section.

With the bayonet ring 16 in free position, as shown in FIG. 3, the tool platen 13 is advanced by means of the shifting cylinders 14 until the tool platens 12 and 13 are at a predetermined relative distance. This distance can be determined by a stop ring 21 which internally is formed in the same manner as the bayonet ring 16 and is passed onto the part of the bayonet rod 15 which projects to the left (FIG. 1) of the backing member 11 and is locked on said part in such a position as to stop the movement of the tool platen 13 by engaging the backing member when the tool platens 12 and 13 are at said predetermined relative distance. The bayonet ring 16 is then turned to latching position. After that pressure is exerted on the backing member by means of the cylinders 18, and the backing member transmits the operating pressure via the bayonet connection 15, 16 to the movable tool platen 13.

While the invention has been described in connection with an injection molding machine having a stationary and a movable tool platen it will be readily seen by those skilled in the art that the invention can be generally utilized in apparatus having a stationary and a movable press platen, for example in hydraulic presses.

We claim:

1. Apparatus comprising a stationary press platen; a movable press platen; first hydraulic means for shifting said movable press platen towards and away from said stationary press platen in a shifting stroke along a central axis of said platens; a backing member movable along the central axis of said platens, said movable press platen being located along the central axis of said platens between said stationary press platen and said backing member; means on said backing member forming a through opening coaxial with the central axis of said platens; an internally circumferentially serrated bayonet locking ring rotatably mounted on said backing member coaxially with the opening in said backing member; a rod connected to said movable press platen and extending through and beyond said locking ring and the opening in said movable backing member; rows of bayonet serrations on said rod for locking engagement with said bayonet locking ring, said rows extending along said rod on both sides of said locking ring and said backing member; means for rotating said locking ring between an angular locking position in which said locking ring and said rows of bayonet serrations are engaged for locking said rod to said backing member, and another angular position in which said rod is free to move lengthwise through said ring and the opening in said backing member, an internally circumferentially serrated bayonet stop ring for engagement with said rows of bayonet serrations on said rod in any selected position along said rod on the part of said rod projecting from said backing member away from said movable platen to limit the shifting stroke of said movable platen towards said stationary platen by engagement with said backing member; and second hydraulic means connected to said stationary press platen and said backing member for moving said movable backing member, said bayonet locking ring, said rod, and said movable press platen towards said stationary press platen to exert pressure between said press platens, when said stop ring is in engagement with said backing member and said locking ring is in its locking position.

2. Apparatus according to claim 1, in which said first hydraulic means are connected to said movable press platen and said backing member.